Figure 1:
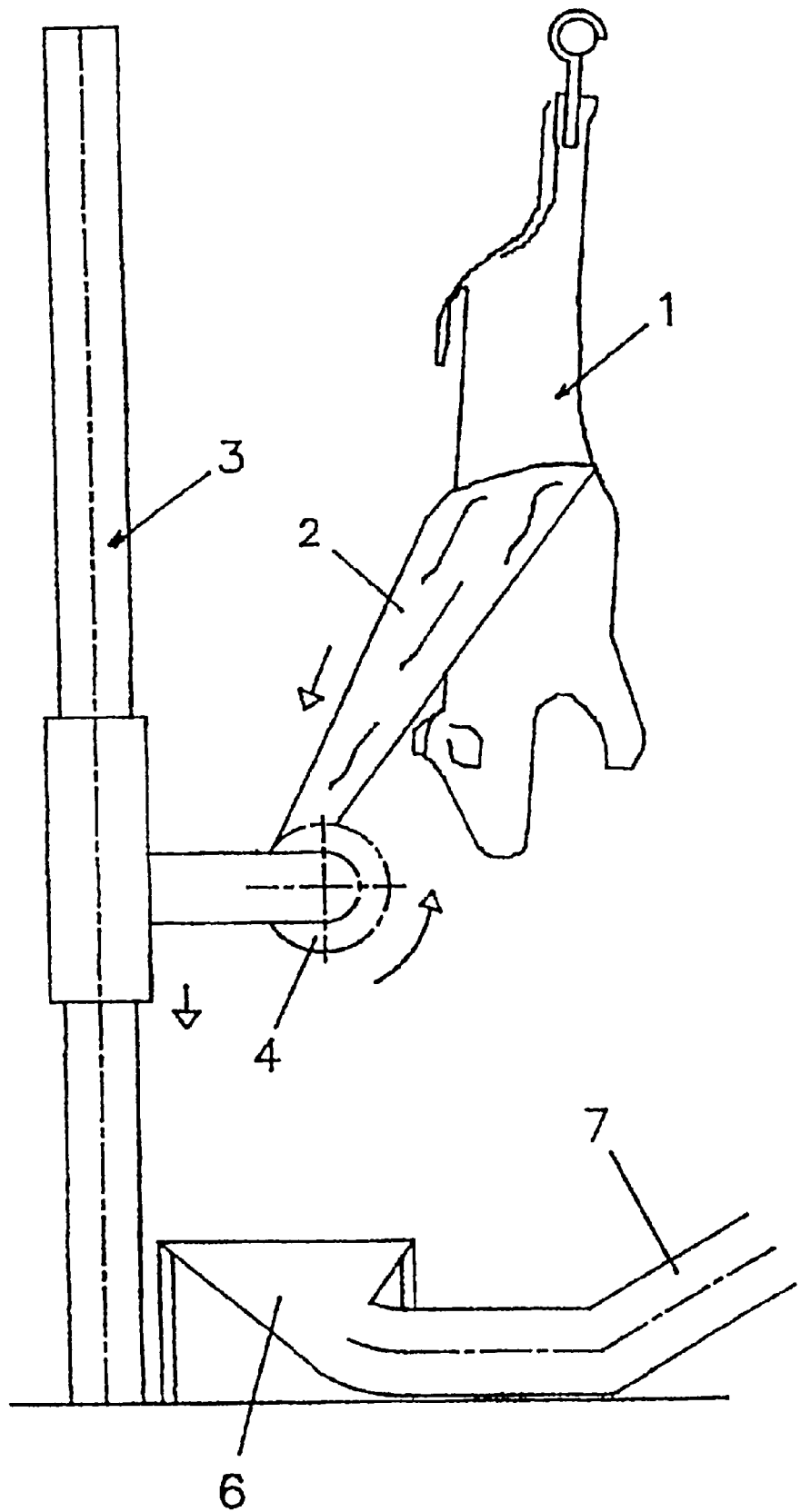

United States Patent [19]
Tornberg

[11] Patent Number: 5,997,393
[45] Date of Patent: Dec. 7, 1999

[54] APPARATUS FOR PEELING AND TRANSFERRING AN ANIMAL HIDE TO PROCESSING

[75] Inventor: Olavi Tornberg, Vantaa, Finland

[73] Assignee: Ins. tsto Tornberg Oy, Vantaa, Finland

[21] Appl. No.: 09/125,275

[22] PCT Filed: Feb. 14, 1997

[86] PCT No.: PCT/FI97/00094

§ 371 Date: Nov. 20, 1998

§ 102(e) Date: Nov. 20, 1998

[87] PCT Pub. No.: WO97/29639

PCT Pub. Date: Aug. 21, 1997

[30] Foreign Application Priority Data

Feb. 16, 1996 [FI] Finland ................................ 960105 U
Apr. 26, 1996 [FI] Finland ................................ 960222 U

[51] Int. Cl.$^6$ ................................................ A22B 5/08
[52] U.S. Cl. ................................ 452/129; 452/177
[58] Field of Search ............................ 452/129, 128, 452/177

[56] References Cited

U.S. PATENT DOCUMENTS

| | | |
|---|---|---|
| 3,479,686 | 11/1969 | Troy . |
| 3,541,637 | 11/1970 | Robinson et al. ............... 452/128 |
| 3,737,949 | 6/1973 | Davis . |
| 4,011,630 | 3/1977 | Ochylski ......................... 452/128 |
| 4,035,868 | 7/1977 | Gardner et al. . |
| 4,127,917 | 12/1978 | Pohil et al. ..................... 452/129 |
| 4,229,860 | 10/1980 | Irwin .............................. 452/129 |
| 4,392,274 | 7/1983 | Noroy ............................. 452/129 |
| 4,751,768 | 6/1988 | Trujillo, Sr. .................... 452/129 |
| 5,167,569 | 12/1992 | Davis .............................. 452/130 |
| 5,279,578 | 1/1994 | Ekiss et al. ..................... 452/128 |

FOREIGN PATENT DOCUMENTS 251963   6/1964   Australia ............................ 452/128

*Primary Examiner*—Willis Little
*Attorney, Agent, or Firm*—Rockey, Milnamow & Katz, Ltd.

[57] ABSTRACT

A device is described for separating animal skin and for transferring it to further processing through a conveyance channel by using pressure difference. The device comprises a pulling device (3) for separating the skin (2) from the animal carcass (1) and for feeding it to the forward end of a conveyance channel (7), and means (8–10) to generate pressure difference between the ends of the conveyance channel and for separating the conveyed skin (2) form the portage air. According to the invention, the pulling device (3) that engages the other end of the skin (2) further comprises means (4, 5, 12) for feeding the skin (2) to the feed hopper (6) at the forward end of the conveyance channel (7) and for separating it from the pulling device (3) for suction conveyance. In this case, the feeding and separating means (4, 5, 12) are preferably set above the feed hopper (6) so that the skin (2) can be dropped to the feed hopper (6) for the suction conveyance.

9 Claims, 2 Drawing Sheets

APPARATUS FOR PEELING AND TRANSFERRING AN ANIMAL HIDE TO PROCESSING

The invention is related to a device for separating animal skins, such as cow or horse skins, and for transferring them through a conveying passage, by using pressure difference, to further processing and, particularly, to a device that comprises a pulling device for separating the skin from the carcass of the animal and for feeding it to the forward end of the conveying passage, and means for generating pressure difference between the ends of the conveying passage and for separating the conveyed skin from the conveying air.

The term "skin", in this context, refers to the skin of an animal such as a cow, horse or the like that is stripped in a slaughterhouse. The term "stripped" refers to the stripping of the skin from the carcass of the animal in question.

Existing slaughterhouses are designed to comprise two storeys and the treatment of skins generally takes place downstairs beside the skin-pulling device. In such a storey solution the skin is directly dropped downstairs from the roll of the skin pulling device, away from the premises of the slaughterhouse. However, the trend today is to build advantageous one-storey slaughterhouses, whereby it is not possible to utilise gravity in transferring skins downstairs and, therefore, dirty skins have to be conveyed from the slaughterhouse to the skin department.

The transportation of skins sets limitations on the lay-out planning since it is generally not possible to locate the skin department beside the position of skin separation because of other operational starting points. The transportation of skins by long and inconvenient conveyors is not only insanitary and expensive but also requires maintenance. furthermore, the conveyors impede passenger traffic.

The gear for skin transporation known from before includes different conveyors such as belt or slat conveyors and the blowing by overpressure along a tabe (pneumatic cannon). It is difficult to automate the equipment for transportation by pneumatic cannon; it requires the building of a hole over 2 metres deep in the floor so that the skin can be lowered directly from the roll of the pulling device to the transmit arrangement of the funnel-like cannon. The above-mentioned hole structure is insantary and difficult to implement technically, particularly in the existing slaughterhouses. The pneumatic cannon placed on the floor requires at least one worker to precondition the skin for transportation. In the preconditioning, the skin is folded into an elongated fold so that it is easy to push to the elongated funnel tube of the cannon transmit arrangement and it slides well in transit tube without causing blockage.

All these transfer methods and equipment are very expensive and impractical.

The disadvantages of the above-mentioned devices are now eliminated by transferring skins in a channel by using pressure difference, ie., by suction conveyance mainly as defined in the appended claims. In the solution according to the invention, the transfer of skins is automated so that it does not require manpower. The transfer by underpressure (vacuum) is a closed transfer system, hygienic and flexible. Consequently, the location of further processing can be selected according to other productional requirements.

The device according to the invention for separating animal skins and transferring them through a conveyance channel to further processing can be used to apply suction conveyance because the pulling device that engages the other end of the skin comprises means for dropping or lowering the skin, with its opposite end in front, to a feed hopper at the forward end of the conveyance channel, and means for separating the skin from the pulling device for the said suction conveyance. The feeding and separating means are preferably located above the feed hopper, whereby smaller and lighter skins can be dropped to the feed hopper whereas larger and heavier skins are gradually lowered, with the opposite end in front, to the feed hopper, in a controlled manner, before the other end is detached from said means.

In a preferred embodiment of the invention, the inner diameter of the conveyance channel is more than about 200 mm, preferably at least about 210 mm, for example 210–270 mm whereas the amount of vacuum in the suction conveyance is at least 40%. The forward end of the conveyance channel is preferably slightly flattened out, for example, oval.

In a preferred embodiment of the invention, the pulling device is set upwards above an open feed hopper, whereby it comprises a vertically movable pulling roll. At least one zipper provided with a fastening loop and intended to be attached to the other end of the skin, and at least one release member for releasing the fastening loop from the skin can be wound on the pulling roll after the skin has been fed gradually and in a controlled manner to the feed hopper with its opposite end in front. The release member is preferably a release chain wound on the pulling roll in the opposite direction with respect to tie zipper. This solution can be used to quickly and effectively release the skin for the suction conveyance.

The tail of the conveyance channel can be connected to a separating chamber which again is connected to an underpressure centre to maintain pressure difference between the ends of the conveyance channel and which comprises a lower part with an openable bottom door for the discharging of the thus conveyed skin from the device for filter processing. A vacuum battery can be used as the underpressure centre.

Figure 2:
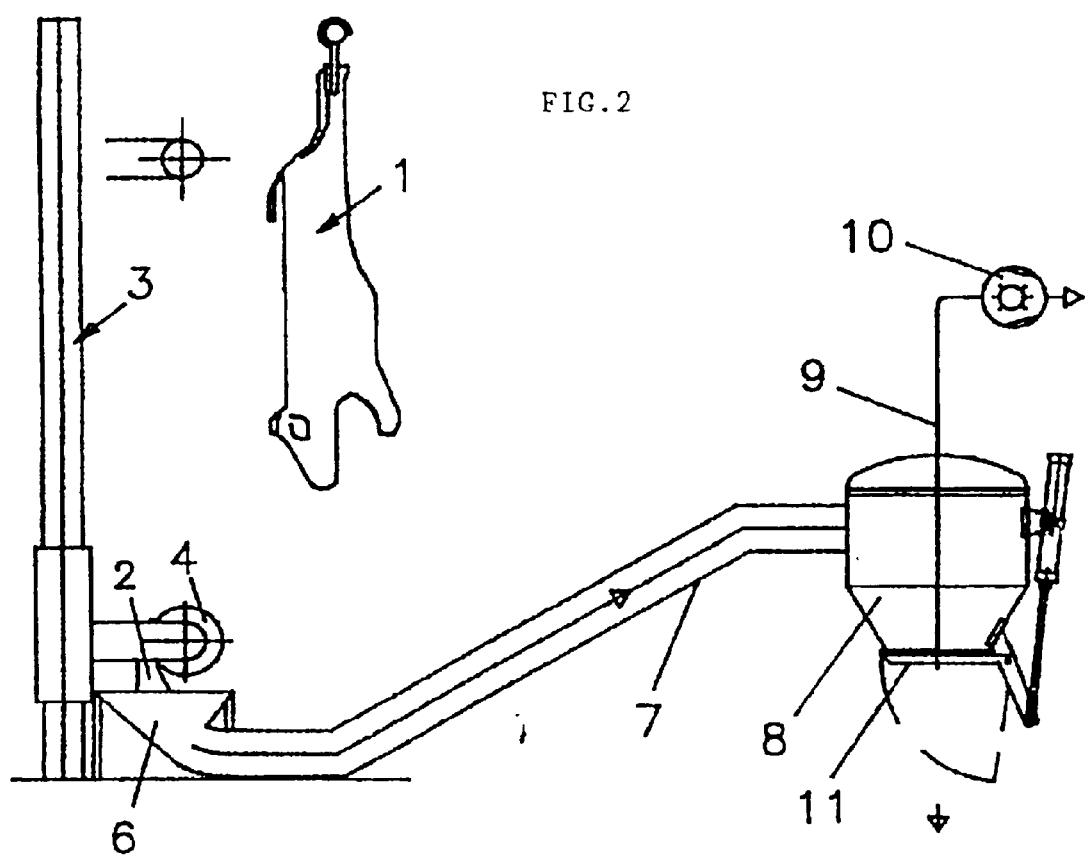
Figure 3:
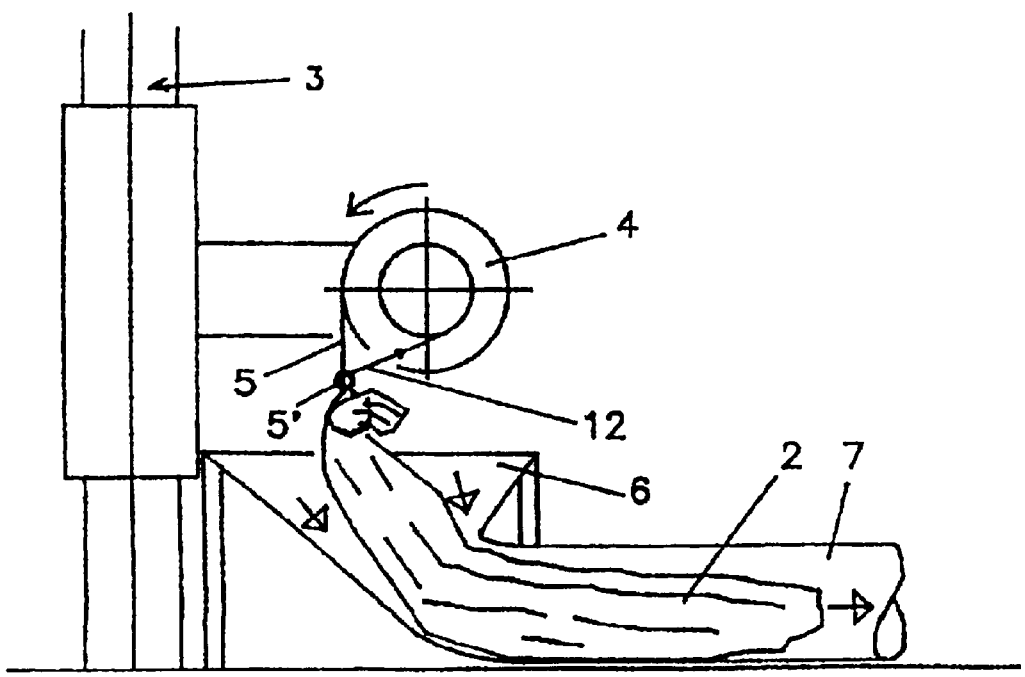

The need for space of such device is small because there is only one conveyance channel, such as a test tube, between the pulling device and the separating chamber, which, when necessary, can criss-cross as desired in the production premises.In the following the invention is described in detail with reference to the appended drawings in which:

FIG. 1 presents the first part of the device according to the invention for the separation of anmal skin from the carcass and for its transportation to the forward end of the conveyance channel gradually in a controlled way, FIG. 2 is a vertical section of the preferred embodiment of the invention, and FIG. 3 is a cross-cut side view of the first part of the device according to FIG. 2.

FIGS. 1 and 2 present the skin of an amal such as a cow, marked by reference number 1, and the skin is marked by 2. Skin 2 is separated from carcass 1 by wounding the skin on pulling roll 4 of pulling device 3. First, 2 is attached to fastening loops 5' of zippers 5 of the skin at the skirt of the skin. Next, pulling device 3 winds skin 2 on its pulling roll 4 by simultaneously moving to the lower position above feed hopper 6 of the skin The transfer tube of the skin is marked reference number 7. Feed hopper 6 is attached to the forward end of the transfer tube and skin 2 is fed to the feed hopper together with air. Separation chamber 8 is provided at the opposite end of transfer tube 7 in which skin 2 is separated by centrifugal force from the portage air and drops down to the bottom of separation chamber 8. Portage air is sucked from separation chamber 8 through tube 9 to underpressure centre 10. After the transportation, bottom door 11 of separation chamber 8 is opened, whereby skin 2 drops down to the collection point for further processing.

As FIG. 3 more closely presents, feed hopper 6 is located so that, when discharging skin 2 from its pulling roll 4, skin pulling device 3 feeds the skirt of the skin to transfer tube 7 along with air motion. Skin 2 is pulled to transfer tube 7 by suction at the same speed as skin pulling device 3 discharges skin 2 from its pulling roll 4. The simultaneous suction both keeps skin 2 straight and shapes it into the form of transfer tube 7, not letting skin 2 pile up and block the junction between feed hopper 6 and transfer tube 7. Upon skin 2 fully unrolling from pulling roll 4 through feed hopper 6 to transfer tube 7, release chains 12 of the pulling device are tensioned and release skin 2 from chain links 5' of zipper 5. After having been released from links 5' of zipper 5 of skin pulling device 3, skin 2 is moved by suction conveying along tube 7 to separation chamber 8. The suction is discontinued and bottom door 11 of separation chamber 8 is opened and skin 2 is dropped to the collection point.

Pulling roll 4 of skin pulling device 3 moves to its upper position for the next pulling of skin.

EXAMPLE

A transfer device according to FIGS. 1–3 was built, comprising an 8000 litre container (underpressure battery) as unde pressure centre 10, from which 40% air had been sucked out, i.e., its vacuum was 400 mbar. The underpressure battery was connected to separation chamber 8 by a 100 mm diameter tube 9 comprising a quickly-openable ball valve. The inner diameter of transfer tube 7 was 267 mm and the length of tube 7 was 12 m, including 2.5 mm of delivery lift. This tube size enabled an easy feeding of skin 2 to feed hopper 6. when the living weight of cow was lower than 700 kg and when a vacuum of at least about 400 mbar was used in the suction conveying.

With a living weight of cow increasing to over 1000 kg, skin 2 is so large and heavy that it must be fed to feed hopper 6 with the above-mentioned tube size gradually in a controlled way. In the device according to the invention, the feeding of the skin to the feed hopper can be cared out easily with success.

An optimal tube size without controlled feed (the skin is sucked to the tansfer tube in a bundle or a ball) for Finnish cow skin is about 210 mm, when the amount of underpressure air, 40% of a complete vacuum, is about 5000 volumetric litre. With the length and diameter of the transfer tube increasing, the amount of underpressure air increases, correspondingly. When the underpressure is smaller, the diameter of the tube must be correspondingly larger.

The shape of the forward end of transfer tube 7 connected to feed hopper 6 also influences the blocking sensitivity (the vault-forming) of the transfer channel. When a flattened forward end of the tube was used, i.e., the forward end was in the form of an ellipse, the above-mentioned sensitivity to block was decreased considerably.

It is advisable to provide the underpressure centre 10 with a 2000–5000 litre underpressure battery to exert a sufficient charging stroke to pull the skin to transfer tube 7, simultaneously preventing by-pass flow between the skin and the wall of the tube.

What is claimed is:

1. A device for separating animal skin and for transferring it to further processing through a conveyance channel by using pressure difference, comprising a pulling device (3) for separating the skin (2) from a carcass (1) and for feeding it to the forward end of a conveyance channel (7), and means (8–10) for generating a pressure difference between the ends of the conveyance channel and for separating the conveyed skin (2) form the portage air, characterised in that the pulling device (3) that engages the other end of the skin (2) comprises means (4, 5, 12) for feeding the skin (2) to a feed hopper (6) at the forward end of the conveyance channel (7) and for separating it from the pulling device (3) for conveyance by suction.

2. A device according to claim 1, characterised in that the feeding and separating means (4, 5, 12) are set above the feed hopper (6) so that the skin (2) can be dropped to the feed hopper (6) for the suction conveyance.

3. A device according to claim 1, characterised in that the feeding and separating means (4, 5, 12) are set above the feed hopper (6) and the feeding means (4, 5) are set to gradually ascend to feed the opposite end of the skin (2) to the feed hopper (6) in a controlled manner before the other end of the skin (2) is detached for the suction conveyance.

4. A device according to claim 1, 2 or 3, characterised in that the inner diameter of the conveyance channel (7) is more than about 200 mm, preferably at least about 210 mm, for example 210–270 mm, with a vacuum of at least about 25–40% in the suction conveyance depending on the weight of the skin (2) and the length of the conveyance channel (7).

5. A device according to claim 1, 2 or 3, characterised in that the forward end of the conveyance channel (7) is slightly flattened, for example in the form of an ellipse.

6. A device according to claim 1, 2 or 3, characterised in that the pulling device (3) comprises, above the upwards-open feed hopper (6), a pulling roll (4) that is essentially vertically movable, and at least one zipper (5) provided with a fasting loop (5') and intended to be attached to the other end of the skin (2) and at least one release member (12) to detach the fastening loop (5') from the skin (2) can be wounded on the pulling roll, when it has been fed gradually in a controlled manner to the feed hopper with its opposite end in front.

7. A device according to claim 6, characterised in that the release member is a release chain (12) wound on the pulling roll (4) in the opposite direction with respect to the zipper (5).

8. A device according to claim 1, 2 or 3, characterised in that the tail of the conveyance channel (7) is connected to a separation chamber (8) which again is connected through a tube (9) to an underpressure centre (10) to maintain a pressure difference between the ends of the conveyance channel (7) and which comprises a lower part with a bottom door (11) which can be opened to discharge the conveyed skin (2) from the device.

9. A device according to claim 8, characterised in that the underpressure centre is an underpressure battery (10) from which a sufficient amount of air has been removed for the suction conveyance.

* * * * *

UNITED STATES PATENT AND TRADEMARK OFFICE
CERTIFICATE OF CORRECTION

PATENT NO.: 5,997,393

DATED : December 7, 1999

INVENTOR(S): Olavi Tornberg

It is hereby certified that error appear(s) in the above-identified patent and that said Letters Patent is hereby corrected as shown below:

On title page, under U.S. PATENT DOCUMENTS, "5,279,578" should be --5,279,518--.

In column 1, in line 32, "insanitary" should be --unsanitary--, in line 33, "furthermore" should be --Furthermore--, and, in line 43, "insanitary" should be --unsanitary--.

In column 2, in line 37, "test" should be -- transit and, in line 51, "wounding" should be --winding--.

In column 3, in line 25, "unde pressure" should be --underpressure--, in lines 44-45, "underpressure" should be --underpressurized--, and, in line 47, "underpressure" should be --underpressurized--.

In column 4, in line 41, "wounded" should be --wound--.

Signed and Sealed this

Twenty-seventh Day of February, 2001

Attest:

NICHOLAS P. GODICI

*Attesting Officer*      *Acting Director of the United States Patent and Trademark Office*